United States Patent
Lyu et al.

(10) Patent No.: US 6,706,827 B1
(45) Date of Patent: Mar. 16, 2004

(54) METALLOCENE CATALYSTS FOR OLEFIN OR STYRENE POLYMERIZATION AND POLYMERIZATION METHOD USING THE METALLOCENE CATALYSTS

(75) Inventors: Yi-Yeol Lyu, Taejeon (KR); Jin-Heong Yim, Taejeon (KR)

(73) Assignee: Samsung Atofina Co. Ltd. (KR)

( * ) Notice: Subject to any disclaimer, the term of this patent is extended or adjusted under 35 U.S.C. 154(b) by 383 days.

(21) Appl. No.: 09/703,169

(22) Filed: Oct. 31, 2000

Related U.S. Application Data

(62) Division of application No. 09/231,884, filed on Jan. 14, 1999, now Pat. No. 6,284,700.

(30) Foreign Application Priority Data

Jun. 8, 1998 (KR) .............................................. 98-21032

(51) Int. Cl.$^7$ ............................ C08F 4/64; C08F 112/08
(52) U.S. Cl. ..................... 526/116; 526/114; 526/161; 526/165; 526/346; 526/347; 526/943; 502/113; 502/152
(58) Field of Search ................................. 526/114, 116, 526/161, 165, 346, 943; 502/113, 152

(56) References Cited

U.S. PATENT DOCUMENTS

| | | | |
|---|---|---|---|
| 4,544,762 A | 10/1985 | Kaminsky et al. | 556/179 |
| 5,026,798 A | 6/1991 | Canich | 526/127 |
| 5,506,184 A | 4/1996 | Kissin et al. | 502/115 |
| 5,986,024 A | 11/1999 | Wilson, Jr. | 526/114 |
| 6,010,974 A | 1/2000 | Kim et al. | 502/152 |
| 6,018,064 A * | 1/2000 | Mendez Llatas et al. | 556/11 |
| 6,100,414 A | 8/2000 | Li et al. | 556/11 |
| 6,284,701 B1 * | 9/2001 | Yoon et al. | 502/152 |

FOREIGN PATENT DOCUMENTS

| | | |
|---|---|---|
| EP | 86110324.0 | 7/1986 |
| EP | 210 615 A2 | 2/1987 |
| EP | 0 423 872 | 4/1991 |

* cited by examiner

*Primary Examiner*—Caixia Lu
(74) *Attorney, Agent, or Firm*—Woodcock Washburn LLP

(57) ABSTRACT

The new metallocene catalysts according to the present invention are prepared by reacting a metallocene compound with a compound having at least two functional groups. The metallocene compound is a transition metal compound which a transition metal is coordinated with a main ligand such as cycloalkanedienyl group and an ancillary ligand. The functional groups of the compound having at least two functional groups are selected from the group consisting of a hydroxy group, a thiol group, a primary amine group, a secondary amine group, etc. The metallocene catalysts according to the present invention have a structure which an ancillary ligand of a metallocene compound is bonded with functional groups. A structure of the metallocene catalysts can be varied according to the metallocene compounds, the compound having at least two functional groups, and the molar ratio of each reactant. The metallocene catalyst is employed with a co-catalyst for styrene and olefin polymerization. The co-catalyst is an organometallic compound and a mixture of non-coordinated Lewis acid and alkylaluminium. The organometallic compound is usually alkylaluminoxane and organoaluminium compound. The syndiotactic polystyrenes and the polyolefins having good physical properties are prepared by using the metallocene catalyst according to the present invention. A monomer for polymerization includes styrene, derivatives of styrene, and a compound having ethylenically unsaturated double bonds. Those compounds are homopolymerized and copolymerized to give polystyrene and polyolefin.

4 Claims, No Drawings

US 6,706,827 B1

METALLOCENE CATALYSTS FOR OLEFIN OR STYRENE POLYMERIZATION AND POLYMERIZATION METHOD USING THE METALLOCENE CATALYSTS

This Application is a divisional of U.S. provisional Application Serial No. 09/231,884 filed Jan. 14, 1999, now U.S. Pat. No. 6,284,700.

FIELD OF THE INVENTION

The present invention relates to new metallocene catalysts for use in preparation of olefin or styrene polymers and polymerization methods using the metallocene catalysts. More specifically, the present invention relates to new metallocene catalysts which are capable of preparing olefin or styrene polymers having a high activity, a good stereoregularity, a high melting point, and a good molecular weight distribution in the presence of a small amount of a co-catalyst. The present invention also relates to polymerization method for preparing such olefin or styrene polymers using the metallocene catalysts.

BACKGROUND OF THE INVENTION

Olefin or styrene polymers are generally prepared by radical polymerization, ionic polymerization, or coordination polymerization using a Ziegler-Natta catalyst. Radical or ionic polymerization provides olefin or styrene polymers having mainly an atactic structure. Coordination polymerization using a Ziegler-Natta catalyst provides olefin or styrene polymers having mainly an isotactic structure.

The polymers are structurally divided into three groups such as atactic polymers, isotactic polymers, and syndiotactic polymers, depending on the position of benzene rings as a side chain in relation to a main chain of molecular structure of the polymers. An atactic structure means that configuration of side chains is irregular. An isotactic structure means that side chains are positioned at one side relative to a main chain. A syndiotactic structure means that side chains are alternatively arranged for a main chain.

The polymers having a syndiotactic structure have been only theoretically known, and practically not prepared until a metallocene catalyst was employed to the preparation methods.

Development of the metallocene catalysts was to provide a syndiotactic polystyrene having a stereoregularity or polyolefins having improved physical properties. The conventional metallocene catalysts have a structure which a Group IV transition metal compound of the Periodic Table of Elements is coordinated with ligands composed of one or two cycloalkanedienyl groups or their derivatives. The Group IV transition b metal of the Periodic Table of Elements contain titanium, zirconium, hafnium, etc. The cycloalkanedienyl groups include a cyclopentadienyl group, an indenyl group, a fluorenyl group, etc.

The metallocene catalysts are usually employed with a co-catalyst. The conventionally used Ziegler-Natta catalysts system is composed of a halogenated titanium compound as a main catalyst and alkylaluminium as a co-catalyst. Example of the halogenated titanium compound is titanium tetrachloride. Example of alkylaluminium is trimethylaluminium and triethylaluminium.

While, recently developed metallocene catalyst system is employed with alkylaluminoxane as a co-catalyst, which is capable of preparing polystyrenes having a stereoregularity or polyolefins having improved physical properties. Alkylaluminoxane is produced by reacting alkylaluminium with $H_2O$. Especially, syndiotactic polystyrene has a structure which benzene rings as a side chain is alternatively positioned relative to a main chain of the polymer. The syndiotactic polystyrene has an excellent heat-resistance and physical properties since the polymer has about 270° C. of a melting point $(T_m)$ due to stereoregularity comparing with the conventional amorphous atactic polystyrene, which is of interest.

European Patent Publication No. 210 615 A2 (1987) discloses a syndiotactic polystyrene having a stereoregularity. Also, the patent discloses cyclopentadienyltitanium trichloride and an alkyl-substituted cyclopentadienyltitanium trichloride such as pentamethylcyclopentadienyltitanium trichloride to prepare syndiotactic polystyrenes. It is known that the metallocene catalysts have a good activity, molecular weight distribution, and syndiotactic index.

U.S. Pat. No. 4,544,762 discloses a preparation method of aluminoxane which can be used as a component of catalysts in the preparation of highly active and homogeneous Ziegler-Natta catalysts.

U.S. Pat. No. 5,026,798 discloses a process for polymerizing α-olefins which utilize certain monocyclopentadienyl metal compounds of a Group IVb transition metal of the Periodic Table of Elements in an aluminoxane activated catalyst system to produce crystalline poly-α-olefins.

U.S. Pat. Nos. 08/844,109 and 08/844,110 disclose a new alkyl bridged binuclear metallocene catalyst (ABBM), silyl bridged binuclear metallocene catalyst (SBBM), and alkyl-silyl bridged binuclear metallocene catalyst (A-SBBM) for preparing a syndiotactic polystyrene having a high activity, a good stereoregularity, a high melting point, and a good molecular weight distribution.

Accordingly, the present inventors have developed new metallocene catalysts for use in preparation of olefin or styrene polymers and polymerization methods for effectively preparing such olefin or styrene polymers using the metallocene catalysts.

OBJECTS OF THE INVENTION

An object of the present invention is to provide metallocene catalysts which are capable of preparing olefin or styrene polymers having a high activity, a good stereoregularity, a high melting point, and a good molecular weight distribution.

Another object of the present invention is to provide highly active metallocene catalysts which are capable of preparing a large amount of olefin or styrene polymers in the presence of a small amount of a co-catalyst.

A further object of the present invention is to provide preparation methods of metallocene catalyst and polymerization methods for effectively preparing olefin or styrene polymers using the metallocene catalysts.

Other objects and advantages of this invention will be apparent from the ensuing disclosure and appended claims.

SUMMARY OF THE INVENTION

The new metallocene catalysts according to the present invention are prepared by reacting a metallocene compound with a compound having at least two functional groups. The metallocene compound is a transition metal compound which a transition metal is coordinated with a main ligand such as cycloalkanedienyl group and an ancillary ligand. Functional groups in the compound having at least two functional groups are selected from the group consisting of a hydroxy group, a thiol group, a primary amine group, a secondary amine group, etc.

The metallocene catalysts of the present invention can be prepared by reacting a metallocene compound with a dianion compound produced by reacting an alkali metal compound with a compound having those functional groups.

The metallocene catalysts according to the present invention have a structure which an ancillary ligand of a metallocene compound is bonded to the functional groups of a compound having at least two functional groups. A structure of the metallocene catalysts can be varied according to the type of metallocene compounds, the type of the compound having at least two functional groups, and the molar ratio of each reactant.

The metallocene catalyst is employed with a co-catalyst for styrene or olefin polymerization. The co-catalyst is an organometallic compound or a mixture of non-coordinated Lewis acid and alkylaluminium as it is widely known. The organometallic compound is usually alkylaluminoxane or organoaluminium compound.

The syndiotactic polystyrenes or polyolefins having high physical properties are prepared by using the catalyst system composed of a metallocene catalyst according to the present invention and a co-catalyst. The monomers for polymerization include styrene, styrene derivatives, or a compound having ethylenically unsaturated double bonds. Those compounds are homopolymerized or copolymerized to give polystyrene or polyolefin having a high activity, a good stereoregularity, a high melting point, and a good molecular weight distribution.

DETAILED DESCRIPTION OF THE INVENTION

The metallocene catalyst according to the present invention is prepared by reacting a metallocene compound with a compound having at least two functional groups. The metallocene catalyst has a structure which an ancillary ligand of a metallocene compound is coordinated with a functional group of a compound having at least two functional groups.

The metallocene compound of the present invention is represented by the following general formulae (A) or (B). The compound having at least two functional groups is represented by the following general formulae (C), (D), or (E).

$$MR^1_a R^2_b R^3_c R^4_{4-(a+b+c)} \quad (A)$$

$$MR^1_d R^2_e R^3_{3-(d+e)} \quad (B)$$

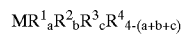 (C)

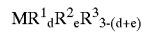 (D)

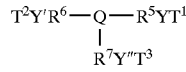 (E)

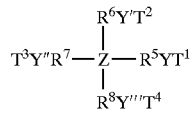

wherein M in the formulae (A) and (B) represents a transition metal of a Group IV, V or VI of the Periodic Table and preferably of a Group IV such as titanium, zirconium or hafnium; $R^1$, $R^2$, $R^3$ and $R^4$ are respectively a hydrogen atom; a halogen atom; an alkyl group, a cycloalkyl group or an alkoxy group of $C_{1-20}$; an aryl group, an alkylaryl group or an arylalkyl group of $C_{6-20}$; a cyclopentadienyl group; a substituted cyclopentadienyl group; an indenyl group; a substituted indenyl group; a fluorenyl group; or a substituted fluorenyl group; a, b and c are respectively an integer of 0 to 4; and d and e are respectively an integer of 0 to 3.

$T^1$, $T^2$, $T^3$, and $T^4$ in the formulae (C), (D), and (E) respectfully represent a hydrogen atom; an alkyl group, a cycloalkyl group, and an alkoxy group of $C_{1-20}$; an aryl group, an alkyaryl group, or an arylalkyl group of $C_{6-20}$; or an alkali metal such as Na, Li, K, etc. Y, Y', Y", and Y''' are respectively of O, S, —Nr$^{17}$, or —Pr$^{18}$ (wherein r$^{17}$ and r$^{18}$ are respectively a hydrogen atom; an alkyl group, a cycloalkyl group, and an alkoxy group of $C_{1-10}$; an aryl group of, an alkyaryl group, and an arylalkyl group of $C_{6-20}$) $R^5$, $R^6$, $R^7$, and $R^8$ are respectively R', R'-m-R", and

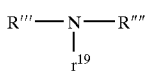

wherein R', R", R''', and R"" are selected from the group consisting of a linear alkylene group and a branched alkylene group of $C_{6-20}$; a cycloalkylene group or a substituted cycloalkylene group of $C_{3-20}$; an arylene group; an alkyarylene group, and an arylalkylene group of $C_{6-40}$; and r$^{19}$ is a hydrogen atom; an alkyl group, a cycloalkyl group and an alkoxy group of $C_{1-10}$; and an aryl group; an alkyaryl group, and an arylakyl group of $C_{6-20}$; and m is an oxygen atom, a sulfur atom, —Nr$^{17}$ or —Pr$^{18}$, and Sir$^{17}$r$^{18}$, wherein r$^{17}$ and r$^{18}$ are respectively a hydrogen atom; an alkyl group, a cycloalkyl group and an alkoxy group of $C_{1-10}$; or an aryl group, an alkylaryl group or an arylalkyl group of $C_{6-20}$.

Q is N or —Cr$^{20}$ (r$^{20}$ is an alkyl group, a cycloalkyl group or an alkoxy group of $C_{1-10}$; or an aryl group, an alkylaryl group or an arylalkyl group of $C_{6-20}$); and

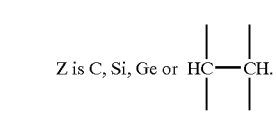

The representative examples of the metallocene catalysts according to the present invention are represented by the following general formulae (I)–(V):

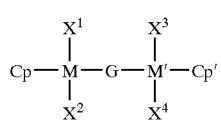 (I)

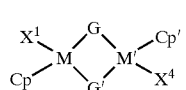 (II)

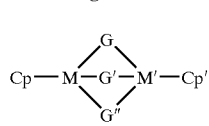 (III)

-continued

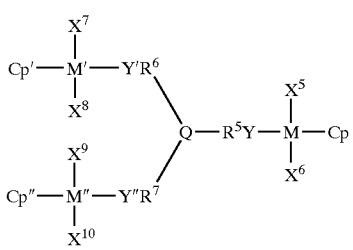

(IV)

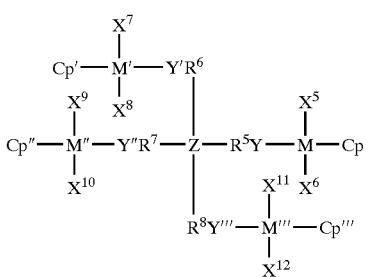

(V)

wherein M, M', M" and M'" in the general formulae (I)~(V) are respectively a transition metal of a Group IV, V, or VI of the Periodic Table and preferably of a Group IV such as titanium, zirconium or hafnium;

Cp, Cp', Cp" and Cp'" are respectively a cyclopentadienyl group, an indenyl group, a fluorenyl group or a derivative of each group which forms $\eta^5$-bond with a transition metal such as M, M', M" and M'", also, Cp, Cp', Cp" and Cp'" are represented by the general formulae (a), (b), (c) or (d);

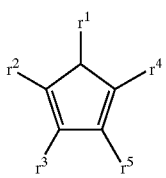

(a)

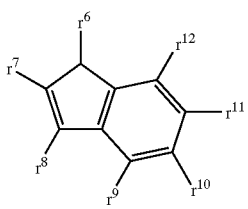

(b)

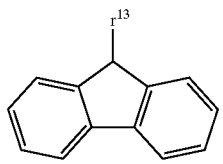

(c)

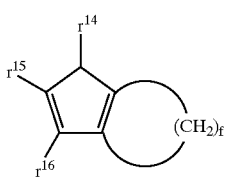

(d)

(wherein $r^1$, $r^2$, $r^3$, $r^4$, $r^5$, $r^6$, $r^7$, $r^8$, $r^9$, $r^{10}$, $r^{11}$, $r^{12}$, $r^{13}$, $r^{14}$, $r^{15}$ and $r^{16}$ are respectively a hydrogen atom; an alkyl group, a cycloalkyl group or an alkoxy group of $C_{1-20}$; or an aryl group, an alkylaryl group or an arylalkyl group of $C_{1-20}$; and f is an integer of 4 to 8.)

$X^1$, $X^2$, $X^3$, $X^4$, $X^5$, $X^6$, $X^7$, $X^8$, $X^9$, $X^{10}$, $X^{11}$ and $X^{12}$ are respectively a hydrogen atom; a hydroxy group; a halogen atom; an alkyl group, a cycloalkyl group or an alkoxy group of $C_{1-20}$; or an aryl group, an alkylaryl group or an arylalkyl group of $C_{1-40}$;

G, G' and G" are the groups connecting between two transition metals and are represented as —$YR^5Y'$— or $T^2$—$YR^5Y'$—$T^1$ (wherein $T^1$ and $T^2$ represent respectively a hydrogen atom; and alkyl group, a cycloalkyl group or an alkoxy group of $C_{1-20}$; or an aryl group, an alkylaryl group or an arylalkyl group of $C_{6-20}$);

Y, Y', Y", and Y'" are respectively of O, S, —$Nr^{17}$, or —$Pr^{18}$ (wherein and $r^{17}$ and $r^{18}$ are respectively a hydrogen atom; an alkyl group, a cycloalkyl group, and an alkoxy group of $C_{1-10}$; an aryl group of, an alkyaryl group, and an arylalkyl group of $C_{6-20}$). $R^5$ is R', R'-m-R", and

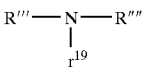

wherein R', R", R'", and R"" are selected from the group consisting of a linear alkylene group and a branched alkylene group of $C_{6-20}$; a cycloalkylene group or substituted cycloalkylene group of $C_{3-20}$; an arylene group; an alkyarylene group, and an arylalkylene group of $C_{6-40}$. $r^{19}$ is a hydrogen atom, an alkyl group, a cycloalkyl group and an alkoxy group of $C_{1-10}$; and an aryl group; an alkyaryl group, and an arylakyl group of $C_{6-20}$. m is an oxygen atom, a sulfur atom, —$Nr^{17}$ or —$Pr^{18}$, and $Sir^{17}r^{18}$, wherein $r^{17}$ and $r^{18}$ are respectively a hydrogen atom; an alkyl group, a cycloalkyl group or an alkoxy group of $C_{1-10}$; or an aryl group, an alkylaryl group or an aryl group of $C_{6-20}$.

Q is N or —$Cr^{20}$ (wherein $r^{20}$ is a hydrogen atom; an alkyl group, a cycloalkyl group or an alkoxy group of $C_{1-10}$; or an aryl group, an alkylaryl group or an arylalkyl group of $C_{6-20}$); and

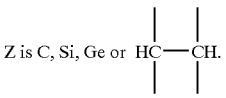

A metallocene compound used for preparing the metallocene catalyst according to the present invention is commercially available. Also, the metallocene compound may be prepared according to a method which is conventionally well known. The metallocene compound can be prepared by the steps comprising; preparing a salt of a substituted cyclopentadienyl ligand containing alkali metal by reacting the corresponding cyclopentadienyl ligand with an alkali metal or an alkali metal compound, introducing a silicon compound or tin compound to the salt of a substituted cyclopentadienyl ligand, and reacting the above resultant compound with a Group IV transition metal compound.

In case of substituting an ancillary ligand of a metallocene compound with an alkoxy group, an alkyl group, or any other groups, the metallocene compound is reacted with the desired equivalent of alcohol or alkyl metal compound. The above-described method for preparing a metallocene compound may be easily performed by an ordinary skilled person in the art.

The alkali metals or alkali metal compounds include K, Na, n-butyllithium, sec-butyllithium, tert-butyllithium, methyllithium, sodium methoxide, sodium ethoxide, etc.

The Group IV transition metal compound of the Periodic Table of Elements include titanium tetrachloride, zirconium tetrachloride, and hafnium tetrachloride.

The representative examples of the metallocene compound represented by the general formula (A) or (B) include:

pentamethylcyclopentadienyltitanium trichloride,
pentamethylcyclopentadienylmethoxytitanium dichloride,
pentamethylcyclopentadienyldimethoxytitanium monochloride,
1,2,3,4-tetramethylcyclopentadienyltitanium trichloride,
1,2,3,4-tetramethylcyclopentadienylmethoxytitanium dichloride,
1,2,3,4-tetramethylcyclopentadienyldimethoxytitanium monochloride,
1,2,4-trimethylcyclopentadienyltitanium trichloride,
1,2,4-trimethylcyclopentadienylmethoxytitanium dichloride,
1,2,4-trimethylcyclopentadienyldimethoxytitanium monochloride,
1,2,-dimethylcyclopentadienyltitanium trichloride,
1,2,-dimethylcyclopentadienylmethoxytitanium dichloride,
1,2,-dimethylcyclopentadienyldimethoxytitanium monochloride,
methylcyclopentadienyltitanium trichloride,
methylcyclopentadienylmethoxytitanium dichloride,
methylcyclopentadienyldimethoxytitanium monochloride,
cyclopentadienyltitanium trichloride, cyclopentadienylmethoxytitanium dichloride, cyclopentadienyldimethoxytitanium monochloride,
pentamethylcyclopentadienylmethyltitanium dichloride,
pentamethylcyclopentadienyldimethyltitanium monochloride,
1,2,3,4-tetramethylcyclopentadienylmethyltitanium dichloride,
1,2,3,4-tetramethylcyclopentadienyldimethyltitanium monochloride,
1,2,4-trimethylcyclopentadienylmethyltitanium dichloride,
1,2,4-trimethylcyclopentadienyldimethyltitanium monochloride,
1,2-dimethylcyclopentadienylmethyltitanium dichloride,
1,2-dimethylcyclopentadienyldimethyltitanium monochloride,
methylcyclopentadienylmethyltitanium dichloride,
methylcyclopentadienyldimethyltitanium monochloride,
cyclopentadienylmethyltitanium dichloride, and
cyclopentadienyldimethyltitanium monochloride.

The representative examples of the compound having at least two functional groups represented by the general formulae (C), (D) or (E) include:

ethylene glycol, 1,3-propanediol, 1,2-propanediol, (s)-(+)-1,2-propanediol,
2-methyl-1,3-propanediol, 2,2-dimethyl-1,3-propanediol,
2-ethyl-2-methyl-1,3-propanediol, 2,2-diethyl-1,3-propanediol,
2-methyl-2-propyl-1,3-propanediol, 2-butyl-2-ethyl-1,3-propanediol,
1,4-butanediol, (R)-(−)-1,3-butanediol, (S)-(+)-1,3-butanediol,
(±)-1,2-butanediol, 2,3-butanediol, meso-2,3-butanediol,
(2R,3R)-(−)-2,3-butanediol, (2S,3S)-(+)-2,3-butanediol,
3,3-dimethyl-1,2-butanediol, pinacol, 1,5-pentanediol, 1,4-pentanediol,
1,2-pentanediol, 2,4-pentanediol, (2R,4R)-(−)-pentanediol,
(2S,4S)-(+)-pentanediol, 2-methyl-2,4-pentanediol,
(R)-(−)-2-methyl-2,4-pentanediol, 2,4-dimethyl-2,4-pentanediol,
2,2,4-trimethyl-1,3-pentanediol, 1,6-hexanediol, 1,5-hexanediol,
(±)-1,2-hexanediol, 2,5-hexanediol, 2-ethyl-1,3-hexanediol,
2,5-dimethyl-2,5-hexanediol, 1,7-heptanediol, 1,8-octanediol, 1,2-octanediol,
1,9-nonanediol, 1,10-decanediol, 1,2-decanediol, 1,12-dodecanediol,
(±)-1,2-dodecanediol, cis-1,2-cyclopentanediol, trans-1,2-cyclopentanediol,
1,3-cyclopentanediol, trans-1,2-cyclohexanediol, 1,2-cyclohexanediol,
1,4-cyclohexanediol, 2,5-dimethylcyclohexane-1,4-diol,
2,5-isopropylcyclohexane-1,4-diol, cis-1,2-cyclohexanedimethanol,
1,4-cyclohexanedimethanol, (+)-cis-p-methane-3,8-diol,
(−)-trans-p-methane-3,8-diol, (±)-trans-1,2-cycloheptanediol,
cis-1,2-cyclooctanediol, trans-1,2-cyclooctanediol, 1,4-cyclooctanediol,
cis-1,5-cyclooctanediol, 4,8-bis(hydroxymethyl)tricyclo[5.2.1.02,6]-decane,
(1R,2R,3S,5R)-(−)-pinandiol, 1,5-decalindiol, 3-cyclohexane-1,1-dimethanol,
(±)-trans-2-cyclohexane-1,4-diol, trans-p-ment-6-ene-2,8-diol,
cis -3,5-cyclohexadiene, 5-norbonene-2,2-dimethanol,
(±)-(2-endo,3-exo)-bicyclo[2.2.2]-oct-5-ene-2,3-dimethanol,
1,1,1-tris(hydroxymethyl)ethane, (R)-(+)-1,2,4-butanetriol,
(S)-(−)-1,2,4-butanetriol, 2-ethyl-2-(hydroxymethyl)-1,3-propanediol,
(±)-1,2,3-trihydroxyhexane, 1,2,6-trihydroxyhexane, ethanolamine,
2-hydroxyethylhydrazine, 3-amino-1-propanol, DL-1-amino-2-propanol,
4-amino-1-butanol, (±)-2-amino-1-butanol), 5-amino-1-pentanol,
DL-2-amino-1-pentanol, 6-amino-1-hexanol, 2-(2-aminoethoxy)ethanol,
2-(methylamino)ethanol, 2-(ethylamino)ethanol, 2-(propylamino)ethanol,
diethanolamine, diisopropanolamine, 2-(butylamino)ethanol,
N-methyldiethanolamine, N-ethyldiethanolamine, N-butyldiethanolamine,
triethanolamine, triisopropanolamine,
1-[N,N-bis(2-hydroxyethyl)amino]-2-propanol, catechol, 3-methylcatechol,
4-methylcatechol, 4-tert-butylcatechol, DL-3,4-dihydroxyphenylglycol,
3,5-diisopropylcatechol, 3,5-di-tert-butylcatechol, resorcinol, 2-methylresorcinol, 4-ethylresorcinol, 4-hexylresorcinol, 4-dodecylresorcinol,
5-pentylresorcinol, 5-pentadecylresorcinol, 2,5-dimethylresorcinol,
hydroquinone, methylhydroquinone, tert-butylhydroquinone,
2,3-dimethylhydroquinone, 2,5-di-tert-butylhydroquinone,
2,5-bis(1,1,3,3-tetramethylbutyl)hydroquinone, trimethylhydroquinone,
1,2-dihydroxynaphthalene, 1,3-dihydroxynaphthalene,
1,4-dihydroxynaphthalene, 1,5-dihydroxynaphthalene,
1,6-dihydroxynaphthalene, 2,3-dihydroxynaphthalene,
2,6-dihydroxynaphthalene, 2,7-dihydroxynaphthalene,
bis(2-hydroxyphenyl)methane, (±)-hydrobenzoin, meso-hydrobenzoin,
(R,R)-(+)-hydrobenzoin, (S,S)-(−)-hydrobenzoin, benzopinacole,
1,4-benzenedimethanol, α,α,α',α'-tetramethyl-1,4-benzenedimethanol,
1,5-dihydroxy-1,2,3,4-tetrahydronaphthalene, 2,2'-biphenyldimethanol,
3-(3,5-di-tert-butyl-4-hydroxyphenyl)-1-propanol,
(±)-1-phenyl-1,2-ethanediol, (S)-(+)-1-phenyl-1,2-ethanediol,
(R)-(−)-1-phenyl-1,2-ethanediol, (R)-(+)-1,1,2-triphenyl-1,2-ethanediol,
4,4'-biphenol, phenylhydroquinone, bis(4-hydroxyphenyl)methane,
4,4'-isopropylidenediphenol, 4,4'-(1,4-diisopropylidenediphenol),
2,2-bis(4-hydroxy-3-methylphenyl)propane,
1,1,1-tri(4-hydroxyphenyl)ethane, meso-hexestrol, 1,2-ethanedithiol,
1,3-propanedithiol, 1,2-propanedithiol, 1,4-butanedithiol, 1,3-butanedithiol,
1,5-pentanedithiol, 1,6-hexanedithiol, 1,8-octanedithiol, 1,9-nonanedithiol,
2-mercaptoethanol, 1-mercapto-2-propanol, 3-mercapto-2-butanol, n
3-mercapto-1,2-propanediol, 2,3-dimercapto-1-propanol, dithiothreitol,
dithioerythritol, 2-mercaptoethyl ether, 1,4-dithiane-2,5-diol,
2,5-dimethyl-2,5-dihydroxy-1,4-dithiane,
1,5,9,13-tetrathiacyclohexadecane-3,11-diol,
1,5,9,13,17,21-hexathiacyclotetracosane-3,11,19-triol, ethyleneamine,
1,3-diaminopropane, 1,2-diaminopropane, 1,4-diaminobutane,
1,2-diamino-2-methylpropane, 1,6-hexanediamine, 1,7-diaminoheptane,
1,8-diaminooctane, 2,5-dimethyl-2,5-hexanediamine, 1,9-diaminononane,
1,10-diaminodecane, 1,12-diaminododecane, spermidine, 4,4'-methylenebis(cyclohexylamine),
4,4'-methylenebis(2-methylcyclohexylamine), 1,4-diaminocyclohexane,
1,3-cyclohexanebis(methylamine), 1,8-diamino-p-methane,
4,4'-trimethylenedipiperidine, 2-piperidinethanol, 3-piperidinethanol,
4-hydroxypiperidine, 4,4'-trimethylenebis(1-piperidinethanol),
2,2,6,6-tetramethyl-4-piperidinol, piperazine, 2,6-dimethylpiperazine,
1,4-bis(2-hydroxyethyl)piperazine, homopiperazine, 1,4,7-triazacyclononane,
1,5,9-triazacyclododecane, cyclene, 1,4,8,11-tetraazacyclotetradecane,
1,4,8,12-tetraazacyclotetradecane, 2-anilinoethanol, N-phenyldiethanolamine,
3-aminophenol, 3-aminothiophenol, 4,4'-ethylenedianiline,
3,3'-methylenedianiline, 4,4'-ethylenedianiline, 4-aminophenyl ether,
4-aminophenol, 4-aminophenethyl alcohol,
4,4'-methylenebis(2,6-dimethylaniline), 4,4'-methylenebis(2,6-diethylaniline),
4,4'-methylenebis(2,6-diisopropylaniline), 3,3',5,5'-tetramethylbenzidine,
1,4-phenylenediamine, N,N'-diphenyl-1,4-phenylenediamine,
2,7-diaminofluorene, N,N'-dibenzylethylenediamine, (±)-syneprine,
4-hydroxy-4-phenylpiperidine, 1,3-bis(phenylphosphino)propane,
1,2-bis(phophino)benzene, 4,4'-isopropylidenedicyclohexanol,
4,4'-(hexafluoroisopropyllidene)diphenol,
4,4'-(phenylenediisopropylidene)bisphenol and 1,2-bis(phosphino)ethane.

The metallocene catalysts are prepared by reacting the metallocene compounds (A) or (B) with the compounds having at least two functional groups (C), (D) or (E) in an organic solvent. The molar ratio of transition metal of the metallocene compound to the compound having at least two functional groups is in the range of 1:0.01~1:1000 and preferably 1:0.1~1:20. The reaction temperature is in the range of −80° C.~−300° C. and preferably 0° C.~150° C. The weight ratio of an organic solvent to the reactants is in the range of 0.1:1~1000:1 and preferably 1:1~100:1.

The metallocene catalyst according to the present invention is employed with a co-catalyst in order to prepare polystyrene having a syndiotactic structure or polyolefin having improved physical properties. The co-catalyst is an organometallic compound or a mixture of non-coordinated Lewis acid and alkylaluminium as is widely known. The organometallic compound is an alkylaluminoxane or an organoaluminium compound. The representative examples of alkylaluminoxane are methylaluminoxane (MAO) and modified methylaluminoxane (MMAO).

The organoaluminium compound is aluminoxane having the structural unit represented by the general formula (F). There are aluminoxane having a chain structure represented by the general formula (G) and aluminoxane having cyclic structure represented by the general formula (H).

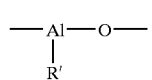
(F)

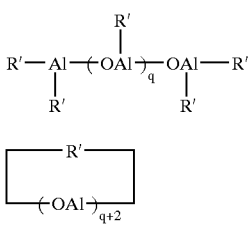

(G)

(H)

wherein R' is an alkyl group of $C_{1-6}$ and q is an integer of 0 to 100.

The olefin or styrene polymerization employs a new metallocene catalyst according to the present invention and a co-catalyst such as organometallic compound. The component ratio of the new metallocene catalyst to organometallic compound is the same as the molar ratio of a transition metal (IV) in the new metallocene catalyst to the aluminium in the organometallic compound. That is, the molar ratio of the transition metal to aluminium is in the range of 1:1 to $1 \times 10^6$ and preferably in the range of 1:10 to $1 \times 10^4$.

The co-catalyst used in the present invention is a mixture of non-coordinated Lewis acid and alkylaluminium. Examples of non-coordinated Lewis acid include N,N-dimethylanilinium tetrakis(pentafluorophenyl)borate, triphenylcarbenium tetrakis(pentafluorophenyl)borate, and ferrocerium tetrakis(pentafluorophenyl)borate. Examples of alkylaluminium include trimethylaluminium, triethylaluminium, diethylaluminium chloride, triisobutylaluminium, diisobutylaluminium chloride, diisobutylaluminium hydride, tri(n-butyl)aluminium, tri(n-propyl)aluminium, and triisopropylaluminium.

The molar ratio of non-coordinated Lewis acid to a transition metal in the catalyst system according to the present invention is preferably in the range of 0.1:1~20:1. The molar ratio of a transition metal to alkylaluminium in the catalyst system is preferably in the range of 1:1~1:3000 and more preferably in the range of 1:50~1:1000.

The reaction temperature for styrene or olefin polymerization by using the catalyst system according to the present invention is preferably in the range of 0~140° C. and more preferably in the range of 30~100° C.

The monomers for polymerization by using the catalyst system according to the present invention are a styrene, a styrene derivative, or an ethylenically unsaturated compound. Those monomers can be homopolymerized or copolymerized.

The styrene and styrene derivative are represented by the general formulae (I) or (J):

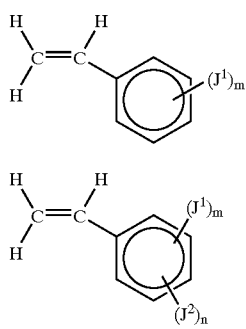

wherein $J^1$ in the general formula (I) is a hydrogen atom; a halogen atom; or C, O, Si, P, S, Se or Sn, and m is an integer of 1 to 3, $J^1$ may be different substituents independently of each other if m is 2 or 3; and $J^1$ in the general formula (J) is the same as defined in the formula (I), $J^2$ is a substituent composed of 2 to 10 carbon atoms having at least one unsaturated bond, m is an integer of 1 to 3, and n is an integer of 1 or 2, in which the benzene ring may independently have different substituents if m is over 2 and n is 2.

The illustrative examples of the compounds represented by the general formula (I) include alkylstyrene, halogenated styrene, halogen-substituted alkylstyrene, alkoxystyrene, vinylbiphenyl, vinylphenylnaphthalene, vinylphenylanthracene, vinyphenylpyrene, trialkylsilybiphenyl, trialkylstannylbiphenyl compound, alkylsilystyrene, carboxymethylstyrene, alkylester styrene, vinylbenzenesulfonic acid ester, and vinylbenzyldialkoxy phosphate.

The alkylstyrene includes styrene, methylstyrene, ethylstyrene, n-butylstyrene, p-methylstyrene, p-tert-butylstyrene, and dimethylstyrene.

The halogenated styrene includes chlorostyrene, bromostyrene, and fluorostyrene.

The halogenated alkylstyrene includes chloromethylstyrene, bromomethylstyrene, and fluoromethylstyrene.

The alkoxystyrene includes methoxystyrene, ethoxystyrene, and butoxystyrene.

The vinylbiphenyl includes 4-vinylbiphenyl, 3-vinylbiphenyl, and 2-vinylbiphenyl.

The vinylphenylnaphthalene includes 1-(4-vinylphenylnaphthalene), 2-(4-vinylphenylnaphthalene), 1-(3-vinylphenylnaphthalene), 2-(3-vinylphenylnaphthalene), and 1-(2-vinylphenylnaphthalene).

The vinylphenylanthracene includes 1-(4-vinylphenylanthracene, 2-(4-vinylphenyl)anthracene, 9-(4-vinylphenyl)anthracene, 1-(3-vinylphenyl)anthracene, 9-(3-vinylphenyl) anthracene, and 1-(2-vinylphenyl)anthracene.

The vinylphenylpyrene includes 1-(4-vinylphenyl) pyrene, 2-(4-vinylphenyl)pyrene, 1-(3-vinylphenyl)pyrene, 2-(3-vinylphenyl)pyrene, 1-(2-vinylphenyl)pyrene, and 2-(2-vinylphenyl)pyrene.

The trialkylsilyvinylbiphenyl includes 4-vinyl-4-trimethylsilybiphenyl.

The trialkylstannylbiphenyl includes 4-vinyl-4-triethylstannylbiphenyl.

The alkylsilystyrene includes p-trimethylsilystyrene, m-trimethylsilystyrene, o-trimethylsilystyrene, p-triethylsilystyrene, m-triethylsilystyrene, and o-triethylsilystyrene.

The illustrative examples of the compounds represented by the general formula (J) include divinylbenzene such as p-divinylbenzene and m-divinylbenzene; trivinylbenzene; and aryl styrene such as p-arylstyrene and m-arylstyrene.

Also, the ethylenically unsaturated monomer is represented by the general formula (K):

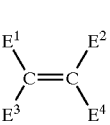

wherein $E^1$, $E^2$, $E^3$ and $E^4$ are respectively functional groups which are selected the group of a hydrogen atom; a halogen atom; and substituents containing at least one atom selected from the group consisting of C, O, Si, P, S, Se and Sn. $E^1$, $E^2$, $E^3$ and $E^4$ are respectively able to have functional groups which are different from each other.

The illustrative examples of the compounds represented by the formula (K) are α-olefin, cyclic olefin, diene, vinylketone, acrolein, acrylonitrile, acryloamide, acrylic acid, and vinyl acetate.

Examples of α-olefin include ethylene, propylene, 1-butene, 1-hexene, and 1-octene.

Examples of cyclic olefin include cyclobutene, cyclopentene, cyclohexene, 3-methylcyclopentene, 3-methylcyclohexene, and norbonene.

Examples of diene include 1,3-butadiene, isoprene, 1-ethoxy-1,3-butadiene, and chloroprene.

Examples of vinylketone include methylvinylketone, phenylvinylketone, ethylvinylketone, and n-propylvinylketone.

Examples of acrolein include acrolein, and metacrolein.

Examples of acrylonitrile include vinylidenecyanide, methoxyacrylonitrile, and phenylacrylonitrile.

Examples of acryloamide include N-methylacryloamide, N-ethylacryloamide, and N-isopropylacryloamide.

Examples of acrylic acid include aryl acrylate, isopropyl acrylate, ethyl acrylate, and acrylic acid chloride.

Examples of vinyl acetate include vinyl acetate and vinyl thioacetate.

A method of polymerization in accordance with the present invention comprises contacting monomers selected from the group consisting of styrenes, its derivatives, or ethylenically unsaturated compounds with the catalyst system according to the present invention. Monomers, co-catalyst and metallocene catalyst of this invention may be added in a row to a polymerization reactor. Also, after reacting the metallocene compound and the compound having at least two functional groups in a polymerization reactor, and co-catalyst and monomers may be added in a row to the polymerization reactor. Further, after reacting the metallocene compound and the compound having at least two functional groups in a polymerization reactor being filled with monomers, and co-catalyst may be added to the polymerization reactor. Further, the polymerization may be performed by reacting the metallocene compound and the compound having at least two functional groups in a reactor being filled with co-catalyst, aging the resultant solution, and adding the aged solution to the polymerization reactor being filled with monomers. The resultant solution is preferably aged at the temperature of 0~150° C. for 1~60 min. The copolymerization of monomers selected from the group consisting of styrenes, its derivatives, ethylenically unsaturated compounds and a mixture thereof may be carried out as in the polymerization above.

The present invention may be better understood by reference to the following examples which are intended for purposes of illustration and are not to be confined as in any way limiting the scope of the present invention, which is defined in the claims appended hereto.

EXAMPLES 1~18

Synthesis of Catalyst

Example 1

Catalyst 1

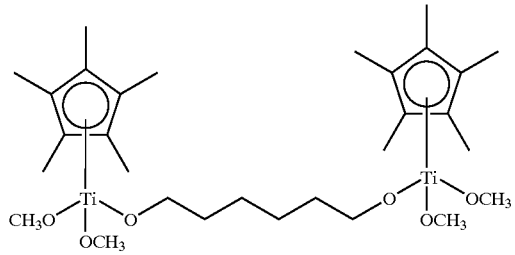

THF (Tetrahydrofuran) 150 ml was added to a round-bottomed flask containing 126 mmol (4.93 g) of potassium. After the temperature of the mixture was decreased to 0° C., Cp*(1,2,3,4,5-pentamethylcyclopentadiene) of 126 mmol (17.17 g) was slowly added to the mixture with stirring and then refluxed. According to proceeding the reaction, white solid was started to be produced. The mixture was refluxed for 1 hr more since white solid was produced. After the temperature was again decreased to 0° C., chlorotrimethylsilane of 130 mmol (14.12 g) was slowly added with a syringe. After the mixture was stirred for 2 hrs, it was filtered through celite to obtain transparent yellowish solution. THF was evaporated under the vacuum (about 0.1 torr) to give a product which trimethylsilane is bonded to Cp*(1,2,3,4,5-pentamethylcyclopentadiene). The yield was 90%.

The product which trimethylsilane was bonded to Cp*(1,2,3,4,5-pentamethylcyclopentadiene) was mixed with toluene of 50 ml The mixed solution was dropwisely added to a round-bottomed flask containing $TiCl_4$ of 88.9 mmol (16.86 g) and toluene of 200 ml with stirring. After the red solution was stirred for 2 hrs, toluene was evaporated under the vacuum to give a crude solid product. The crude product was washed with n-pentane or n-hexane and dried to obtain the product, that is $Cp*TiCl_3$ which is a metallocene compound. The yield was 95%.

$Cp*TiCl_3$ of 20 mmol (5.79 g) was dissolved in THF(100 ml). To another round-bottomed flask containing methanol of 40 mmol (1.28 g), THF (100 ml) was added. The reaction temperature was decreased to −78° C. with dryice and acetone. After triethylamine of 41 mmol (4.15 g) was dropwisely added to the solution with a syringe, the mixture was stirred for 30 min at −78° C. To the mixed solution, the $Cp*TiCl_3$THF solution was slowly added at −78° C. with stirring. The temperature was increased up to room temperature. After the mixture was stirred for 12 hrs, THF was removed and hexane of 100 ml was added. The solution was stirred for 30 min and filtered through celite to give a yellowish solution. The temperature of the yellowish solution was decreased under −25° C. to obtain an orange-colored solid. The precipitated orange-colored solid was separated from hexane and dried under vacuum to give a product of $Cp*TiCl(OCH_3)_2$ which two chlorides were substituted with two methoxy groups in $Cp*TiCl_3$. The yield was 75%.

$Cp*TiCl(OCH_3)_2$ of 10 mmol (2.8 g) is added to a round-bottomed flask containing THF of 100 ml. To another round-bottomed flask containing 1,6-hexanediol of 5 mmol (0.591 g), THF (100 ml) was added. The reaction temperature was decreased to −78° C. with dryice and acetone. After triethylamine of 11 mmol (1.11 g) was dropwisely added to the solution with a syringe, the mixture was stirred for 30 min at −78° C. To the mixed solution, the Cp*TiCl(OCH$_3$)$_2$/THF solution was slowly added at −78° C. with stirring. The temperature was increased to room temperature. After the mixture was stirred for 12 hrs, THF was removed and hexane of 100 ml was added. The solution was stirred for 30 min and filtered through celite to give a yellowish solution. After the yellowish solution was evaporated under vacuum to remove hexane, catalyst 1 was obtained. The yield was 78%.

Example 2

Catalyst 2

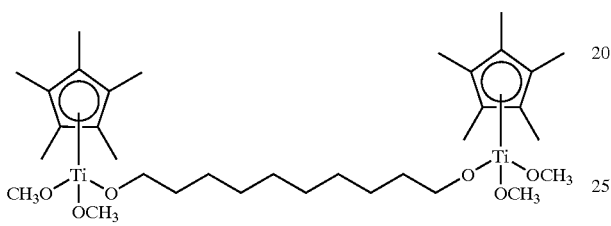

Catalyst 2 was prepared in the same method as in Example 1 except for using 1,10-decanediol instead of 1,6-hexanediol.

Example 3

Catalyst 3

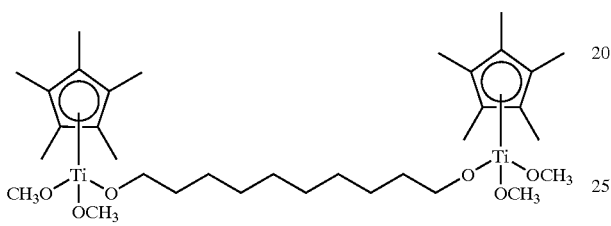

Catalyst 3 was prepared in the same method as in Example 1 except for using 1,12-dodecanediol instead of 1,6-hexanediol.

Example 4

Catalyst 4

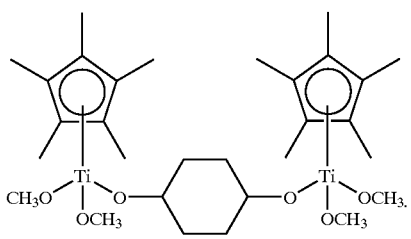

Catalyst 4 was prepared in the same method as in Example 1 except for using 1,4-cyclohexanediol instead of 1,6-hexanediol.

Example 5

Catalyst 5

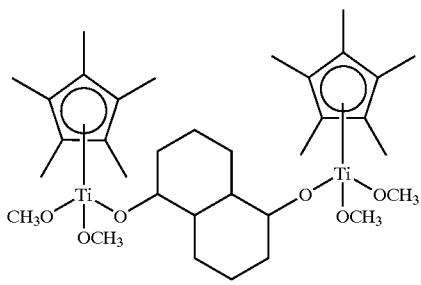

Catalyst 5 was prepared in the same method as in Example 1 except or using 1,4-decalindiol instead of 1,6-hexanediol.

Example 6

Catalyst 6

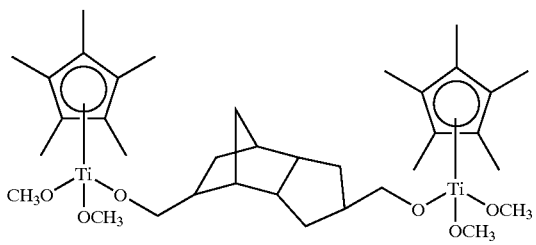

Catalyst 6 was prepared in the same method as in Example 1 except for using 4,8-bis(hydroxymethyl)tricyclo[5.2.1.0$^{2.6}$]-decane instead of 1,6-hexanediol.

Example 7

Catalyst 7

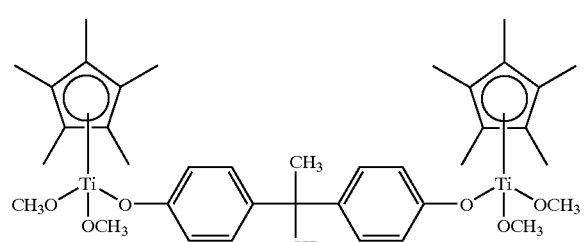

Catalyst 7 was prepared in the same method as in Example 1 except for using 4,4'-isopropylidenediphenol instead of 1,6-hexanediol.

Example 8

Catalyst 8

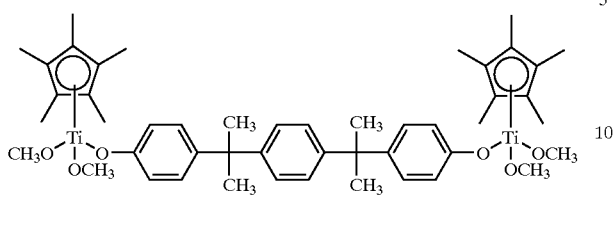

Catalyst 8 was prepared in the same method as in Example 1 except for using 4,4'-(1,4-phenylenediisopropylidene)bisphenol instead of 1,6-hexanediol.

Example 9

Catalyst 9

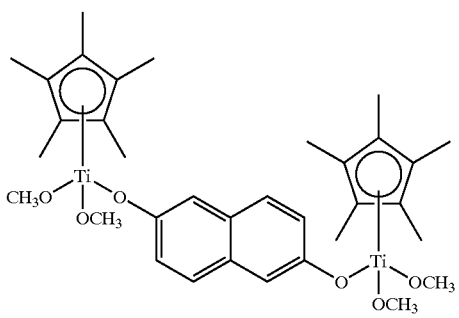

Catalyst 9 was prepared in the same method as in Example 1 except for using 2,6-dihydroxynaphthalene instead of 1,6-hexanediol.

Example 10

Catalyst 10

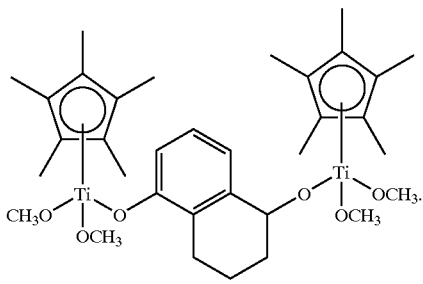

Catalyst 10 was prepared in the same method as in Example 1 except for using 1,5-dihydroxy-1,2,3,4-tetrahydronaphthalene instead of 1,6-hexanediol.

Example 11

Catalyst 11

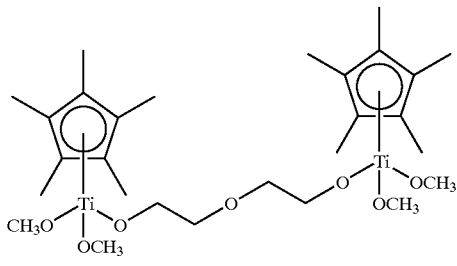

Catalyst 11 was prepared in the same method as in Example 1 except for using di(ethylene glycol) instead of 1,6-hexanediol.

Example 12

Catalyst 12

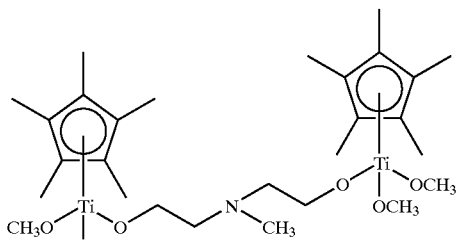

Catalyst 12 was prepared in the same method as in Example 1 except for using N-methyldiethanolamine instead of 1,6-hexanediol.

Example 13

Catalyst 13

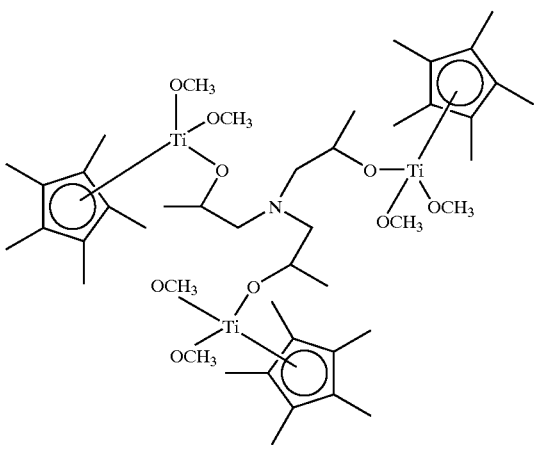

Catalyst 13 was prepared in the same method as in Example 1 except for using triisopropanolamine instead of 1,6-hexanediol, and 1/3 equivalent of triisopropanolamine for 1 equivalent of Cp*Ti(OCH$_3$)$_2$Cl.

Example 14

Catalyst 14

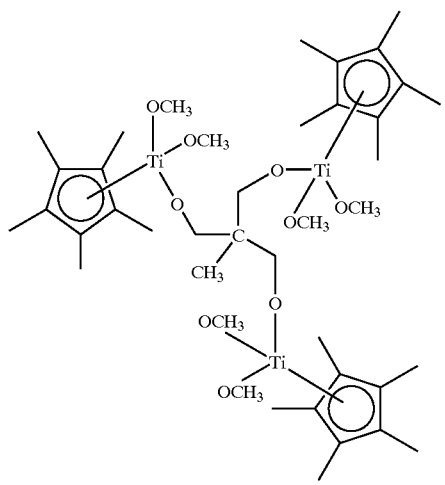

Catalyst 14 was prepared in the same method as in Example 1 except for using 1,1,1-tris(hydroxymethyl)ethane instead of 1,6-hexanediol, and 1/3 equivalent of 1,1,1-tri(hydroxymethyl)ethane for 1 equivalent of Cp*Ti(OCH$_3$)$_2$Cl.

Example 15

Catalyst 15

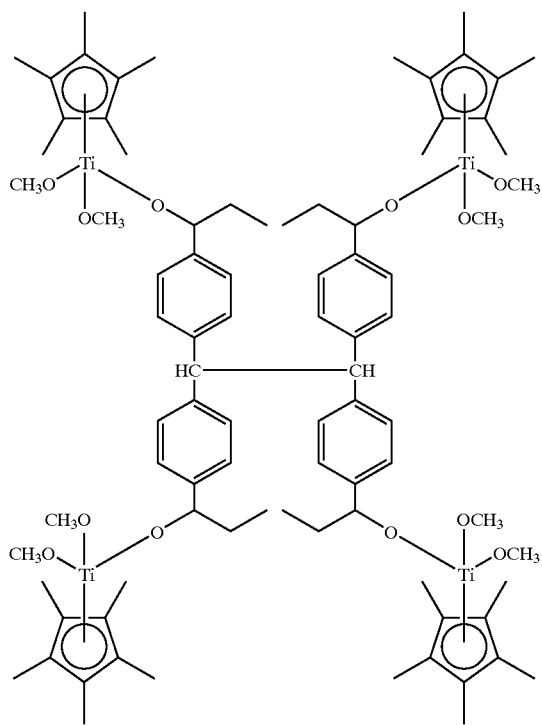

Catalyst 15 was prepared in the same method as in Example 1 except for using tetraol instead of 1,6-hexanediol, and 1/4 equivalent of the tetraol compound for 1 equivalent of Cp*Ti(OCH$_3$)$_2$Cl. The tetraol compound was prepared by reacting tetraphenylolethane glycidyl ether with methylmagnesium bromide.

Example 16

Catalyst 16

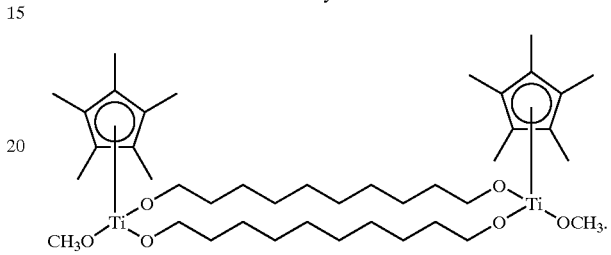

20 mmol (5.79 g) of Cp*TiCl$_3$ prepared according to the method of Example 1 was dissolved in THF of 100 ml. To another round-bottomed flask containing methanol of 20 mmol (0.64 g), THF (100 ml) was added. The reaction temperature was decreased to −78° C. with dryice and acetone. After triethylamine of 21 mmol (2.08 g) was dropwisely added to the solution with a syringe, the mixture was stirred for 30 min at −78° C. The resultant solution was slowly added to the Cp*TiCl$_3$/THF solution at −78° C. with stirring. The temperature was increased up to room temperature. After the mixture was stirred for 12 hrs, THF was removed under vacuum and hexane of 100 ml was added. The solution was stirred for 30 min and filtered through celite to give an orange-colored solution. The temperature of the orange-colored solution was decreased under −25° C. to obtain an orange-colored solid. The precipitated orange-colored solid was separated from n-hexane and dried under vacuum to give a product of Cp*TiCl$_2$(OCH$_3$) which one chloride was substituted to one methoxy group in Cp*TiCl$_3$. The yield was 70%.

Cp*TiCl$_2$(OCH$_3$) of 10 mmol (2.8 g) was added to a round-bottomed flask containing THF of 100 ml. To another round-bottomed flask containing 1,10-decanediol of 10 mmol (1.743 g), THF (100 ml) was added. The reaction temperature was decreased to −78° C. with dryice and acetone. After triethylamine of 22 mmol (2.22 g) was dropwisely added to the solution with a syringe, the mixture was stirred for 30 min at −78° C. The Cp*TiCl$_2$(OCH$_3$)/THF solution was slowly added to the 1,10-decanediol and triethylamine/THF solution at −78° C. with stirring. The temperature was increased up to room temperature. After the mixture was stirred for 12 hrs, the solution was filtered through celite to give a yellowish solution. After the yellowish solution was evaporated under vacuum to remove THF, the catalyst 16 was obtained. The yield was 65%.

Example 17

Catalyst 17

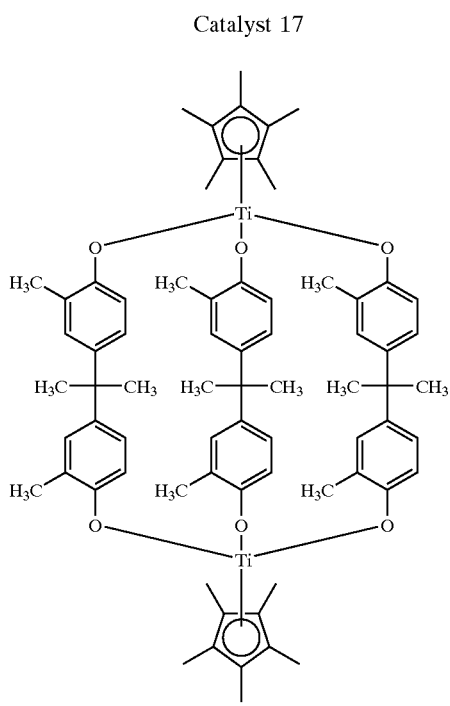

After Cp*TiCl$_3$ was prepared in the method as in Example 1, Cp*TiCl$_3$ of 20 mmol (5.79 g) was added to a round-bottomed flask containing toluene of 100 ml. To another round-bottomed flask containing 2,2-Bis(4-hydroxy-3-methylpheyl)propane 30 mmol (7.69 g), toluene (100 ml) was added. After triethylamine of 61 mmol (6.17 g) was dropwisely added to the solution with a syringe, the mixture was stirred for 10 min at room temperature. The temperature was decreased to −78° C. with dryice and acetone. The 2,2-Bis(4-hydroxy-3-methylpheyl)propane and methylamine/toluene solution was slowly added to the Cp*TiCl$_3$/toluene solution with stirring at −78° C. After the temperature was increased to room temperature and the mixed solution was stirred for 15 hrs. The mixed solution was filtered through celite to give a yellowish solution. After the yellowish solution was evaporated under vacuum to remove toluene, catalyst 17 was obtained. The yield was 85%.

Example 18

Catalyst 18

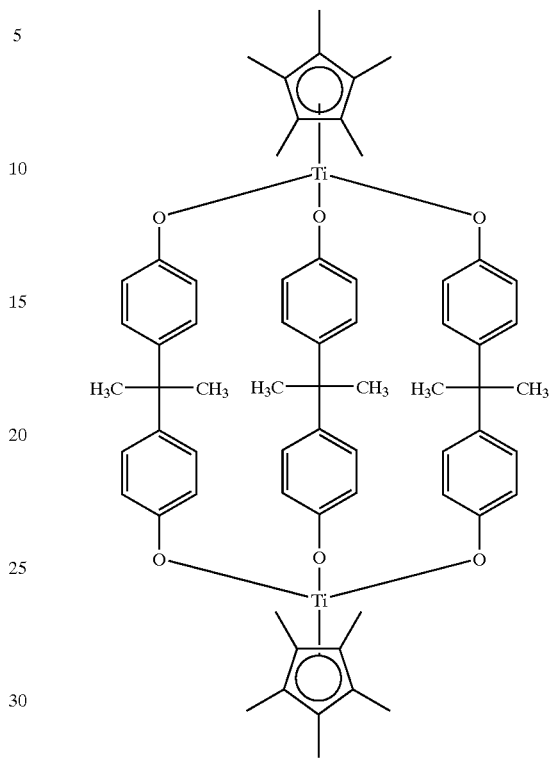

Catalyst 18 was prepared in the same method as in Example 17 except for using 4,4'-isopropylidenediphenol instead of 2,2-Bis(4-hydroxy-3-methylpheyl)propane.

Example 19

Styrene Polymerization (Solution Polymerization)

The styrene polymerization was performed using the new metallocene catalysts 1~18 prepared in Examples 1~18.

The polymerization reaction was proceeded with a metallocene catalyst having a concentration (actually, concentration of titanium) of $4 \times 10^{-6}$ mol, styrene monomer of 5 cc, toluene of 80 cc, and a modified methylaluminoxane having a concentration of aluminium of $1 \times 10^{-3}$ mol, for 30 min and at 70° C.

It was used a temperature-controlling equipment, a magnetic stirrer or a mechanical stirrer for the styrene polymerization. The polymerization was performed in a glass reactor with a valve capable of applying monomer and nitrogen gas. After purified toluene (80 cc) was added to the glass flask filled with nitrogen gas instead of air, the purified styrene (5 cc) was again added, and then modified methylaluminoxane (concentration of aluminium=$1 \times 10^{-3}$ mol) as a co-catalyst was added with stirring. To the above mixed solution, a certain amount of a catalyst (concentration of titanium=$4 \times 10^{-6}$ mol) was added to start polymerizing of the monomer. After the solution was stirred for a while, a small amount of methanol was added to stop proceeding polymerization. The obtained mixture was poured into methanol containing hydrogen chloride (HCl) to give a styrene polymer product. The crude styrene polymer product was washed with methanol, filtered, and vacuum-dried to obtain a pure styrene polymer. The physical properties of the polystyrene obtained by polymerization were shown in Table 1.

TABLE 1

| Catalyst (Example) | Yield (g) | Activity Kg · PS/[Ti][St]hr | Stereo-regularity (%) | Molecular weight (×10³) | Molecular weight distribution | Melting point (° C.) |
|---|---|---|---|---|---|---|
| Catalyst 1 | 1.95 | 22342 | 97 | 232 | 2.54 | 271 |
| Catalyst 2 | 1.97 | 22571 | 98 | 245 | 2.31 | 271 |
| Catalyst 3 | 1.97 | 22571 | 98 | 240 | 2.21 | 271 |
| Catalyst 4 | 1.96 | 22456 | 97 | 210 | 2.13 | 270 |
| Catalyst 5 | 1.93 | 22113 | 96 | 215 | 2.16 | 270 |
| Catalyst 6 | 1.94 | 22227 | 97 | 205 | 2.21 | 271 |
| Catalyst 7 | 1.87 | 21425 | 98 | 234 | 2.10 | 271 |
| Catalyst 8 | 1.91 | 21884 | 98 | 235 | 2.01 | 270 |
| Catalyst 9 | 1.90 | 21769 | 97 | 241 | 2.05 | 271 |
| Catalyst 10 | 1.95 | 22342 | 98 | 243 | 2.03 | 270 |
| Catalyst 11 | 1.30 | 14896 | 95 | 156 | 3.01 | 270 |
| Catalyst 12 | 1.42 | 16269 | 95 | 158 | 3.02 | 269 |
| Catalyst 13 | 1.65 | 18905 | 96 | 210 | 2.50 | 270 |
| Catalyst 14 | 1.60 | 18332 | 96 | 208 | 2.30 | 271 |
| Catalyst 15 | 1.35 | 15467 | 95 | 154 | 3.01 | 269 |
| Catalyst 16 | 2.01 | 23029 | 97 | 246 | 2.30 | 271 |
| Catalyst 17 | 2.81 | 32195 | 99 | 285 | 1.98 | 271 |
| Catalyst 18 | 3.02 | 34601 | 99 | 231 | 2.01 | 271 |

Example 20

Styrene Polymerization (Bulk Polymerization)

The styrene polymerization was performed using several catalysts selected from the group of the new metallocene catalysts 1~18 prepared in Examples 1~18.

The polymerization reaction was proceeded with a catalyst having a concentration (actually, concentration of titanium) of $1.5 \times 10^{-5}$ mol. styrene monomer of 200 cc, triisobutylamine having a concentration of $1.2 \times 10^{-2}$ mol, and modified methylaluminoxane having a concentration of aluminium of $1.5 \times 10^{-3}$ mol, for 1 hour and at 70° C.

A temperature-controlling equipment and a magnetic stirrer or a mechanical stirrer were used for the styrene polymerization. The polymerization was performed in a glass reactor with a valve capable of applying monomer and nitrogen gas. After purified styrene (200 cc) was added to a glass flask filled with nitrogen gas instead of air, and then triisobutylaluminium ($1.2 \times 10^{-2}$ mol) were added. To the resultant solution, modified methylaluminoxane (concentration of aluminium=$1.5 \times 10^{-3}$ mol) as a co-catalyst was added with stirring. To the above mixed solution, a certain amount of a catalyst (concentration of titanium=$1.5 \times 10^{-5}$ mol) was added to start polymerizing of the monomer. After the solution was stirred for a while, a small amount of methanol was added to stop proceeding polymerization. The obtained mixture was poured into methanol containing hydrogen chloride (HCl) to give a styrene polymer product. The crude styrene polymer product was washed with methanol, filtered, and vacuum-dried to obtain a pure styrene polymer. The physical properties of the polystyrene obtained by polymerization are shown in Table 2.

TABLE 2

| Catalyst (Example) | Yield (g) | Activity Kg · PS/[Ti][St]hr | Stereo-regularity (%) | Molecular weight (×10³) | Molecular weight distribution | Melting point (° C.) |
|---|---|---|---|---|---|---|
| Catalyst 2 | 110 | 4200 | 95 | 430 | 2.34 | 271 |
| Catalyst 4 | 112 | 4276 | 95 | 421 | 2.31 | 271 |
| Catalyst 9 | 115 | 4391 | 96 | 405 | 2.21 | 271 |
| Catalyst 16 | 128 | 4887 | 97 | 540 | 2.13 | 272 |
| Catalyst 18 | 138 | 5269 | 99 | 534 | 2.21 | 273 |

Example 21

Preparation of Catalyst and the Solution Polymerization of Styrene in one Reaction Container A temperature-controlling equipment and a magnetic stirrer or a mechanical stirrer were used for the styrene polymerization. The polymerization was performed in a glass reactor with a valve capable of applying monomer and nitrogen gas. The purified toluene (40 cc) was added to a glass flask filled with nitrogen gas instead of air. Pentamethylcyclopentadienyltitaniumtrichloride [Cp*TiCl₃] of $4 \times 10^{-6}$ mol (1.16 mg) diluted with toluene (20 ml) was added. To the above mixture, the solution composed of 4,4-isopropylidenediphenol of $6 \times 10^{-6}$ mol (1.37 mg) and triethylamine of $12.05 \times 10^{-6}$ mol (1.22 mg) in toluene of 20 ml was added with stirring. After the mixed solution was stirred for 1 hour at 100° C., the reaction temperature was decreased to 70° C. Methylaluminoxane (concentration of aluminium=$1.0 \times 10^{-3}$ mol) as a co-catalyst was added to the resultant solution with stirring. The purified styrene (5 cc) was added to the solution to start polymerizing and stirred for 30 min. A small amount of methanol was added to the solution to stop polymerizing.

The obtained mixture was poured into methanol containing hydrogen chloride (HCl) to give a styrene polymer product. The crude styrene polymer product was washed with methanol, filtered, and vacuum-dried to obtain a pure styrene polymer. The physical properties of the polystyrene obtained by polymerization are shown in Table 3.

TABLE 3

| Catalyst (Example) | Yield (g) | Activity Kg · PS/[Ti][St]hr | Stereo-regularity (%) | Melting point (° C.) |
|---|---|---|---|---|
| Catalyst 21 | 2.78 | 31852 | 96 | 271 |

Example 22

Preparation of Catalyst and the Bulk Polymerization of Styrene in One Reaction Container A temperature-controlling equipment and a magnetic stirrer or a mechanical stirrer were used for the styrene polymerization. The polymerization was performed in a glass reactor with a valve capable of applying monomer and nitrogen gas. After purified styrene (150 cc) was added to a glass flask filled with nitrogen gas instead of air, pentamethylcyclopentadienyltitanium trichloride [Cp*TiCl₃] of $1.5 \times 10^{-5}$ mol (4.34 mg) diluted with the purified styrene (20 cc) was added. To the above mixture, the solution composed of 4,4'-isopropylidenediphenol of $2.25 \times 10^{-5}$ mol (5.14 mg) and triethylamine of $4.52 \times 10^{-5}$ mol (4.57 mg) in the purified styrene of 30 cc was added with stirring. After the mixed solution was stirred for 5 hours at room temperature, the reaction temperature was raised up to 70° C. Triisobutylaluminium ($1.2 \times 10^{-2}$ mol) and methylaluminoxane (concentration of aluminium=$1.5 \times 10^{-3}$ mol) as a co-catalyst were added to the resultant solution with stirring to start polymerizing and stirred for 1 hour. A small amount of methanol was added to the solution to stop polymerizing. The obtained mixture was poured into methanol containing hydrogen chloride (HCl) to give a styrene polymer product. The crude styrene polymer product was washed with methanol, filtered, and vacuum-dried to obtain a pure styrene polymer. The physical properties of the polystyrene obtained by polymerization are shown in Table 4.

TABLE 4

| Catalyst (Example) | Yield (g) | Activity Kg · PS/ [Ti][St]hr | Stereoregularity (%) |
|---|---|---|---|
| Catalyst 22 | 135 | 5155 | 99 |

Example 23

Modified Method for Solution Polymerization of Styrene (I)

A temperature-controlling equipment and a magnetic stirrer or a mechanical stirrer were used for the styrene polymerization. The polymerization was performed in a glass reactor with a valve capable of applying monomer and nitrogen gas. Purified toluene (40 cc) was added to a glass flask filled with nitrogen gas instead of the air. Pentamethylcyclopentadienyltitanium trichloride [Cp*TiCl$_3$], pentamethylcyclopentadienylmethoxytitanium dichloride [Cp*Ti(OMe)Cl$_2$], or pentamethylcyclopentadienyldimethoxytitanium chloride [Cp*Ti(OMe)$_2$Cl] of $4 \times 10^{-6}$ mol diluted with toluene (20 cc) was added to the flask containing the purified toluene of 40 cc. To the above solution, the solution composed of triethylamine and the compound having at least two functional groups which is represented in the following Table 5 in toluene of 20 cc were added with stirring. After the mixed solution was stirred for 5 hours at room temperature, the reaction temperature was raised up to 70° C. Methylaluminoxane (concentration of aluminium=$1.0 \times 10^{-3}$ mol) as a co-catalyst was added to the resultant solution with stirring. Purified styrene (5 cc) was added to the solution to start polymerizing and stirred for 30 min. A small amount of methanol was added to the solution to stop polymerizing.

The obtained mixture was poured into methanol containing hydrogen chloride (HCl) to give a styrene polymer product. The crude styrene polymer product was washed with methanol, filtered, and vacuum-dried to obtain a pure styrene polymer. The physical properties of the polystyrene obtained by polymerization are shown in Table 5.

TABLE 5

| Half metallocene catalyst (mol) | Compound having at least two functional groups (mol) | Mole of N(C$_2$H$_5$)$_3$ | Yield (g) | Activity Kg · PS/[Ti] [St]hr | Stereo-regularity (%) |
|---|---|---|---|---|---|
| Cp*Ti(OMe)$_2$Cl ($4 \times 10^{-6}$ mol) | 1,10-Decandiol ($2 \times 10^{-6}$ mol) | $4 \times 10^{-6}$ mol | 1.71 | 19610 | 97 |
| Cp*Ti(OMe)Cl$_2$ ($4 \times 10^{-6}$ mol) | 1,10-Decandiol ($4 \times 10^{-6}$ mol) | $8 \times 10^{-6}$ mol | 1.76 | 20183 | 97 |
| Cp*TiCl$_3$ ($4 \times 10^{-6}$ mol) | 1,10-Decandiol ($6 \times 10^{-6}$ mol) | $12 \times 10^{-6}$ mol | 2.10 | 24083 | 98 |
| Cp*TiCl$_3$ ($4 \times 10^{-6}$ mol) | 4,4'-Isopropylidene-diphenol ($6 \times 10^{-6}$ mol) | $12 \times 10^{-6}$ mol | 2.52 | 28899 | 98 |

Example 24

Modified Method for Solution Polymerization of Styrene (II)

A temperature-controlling equipment and a magnetic stirrer or a mechanical stirrer were used for the styrene polymerization. The polymerization was performed in a glass reactor with a valve capable of applying monomer and nitrogen gas. After purified toluene (40 cc) was added to a glass flask filled with nitrogen gas instead of air, purified styrene (5 cc) was added. Pentamethylcyclopentadienyltitanium trichloride [Cp*TiCl$_3$] pentamethylcyclopentadienylmethoxytitanium dichloride [Cp*Ti(OMe)Cl$_2$], or pentamethylcyclopentadienydimethoxyltitanium chloride [Cp*Ti(OMe)$_2$Cl] of $4 \times 10^{-6}$ mol diluted with toluene (20 cc) was added. To the above mixture, the solution composed of triethylamine and the compound having at least two functional groups which is represented in the following Table 6 in toluene of 20 cc were added with stirring. After the mixed solution was stirred for 5 hours at room temperature, the reaction temperature was raised up to 70° C. Methylaluminoxane (concentration of aluminium=$1.0 \times 10^{-3}$ mol) as a co-catalyst was added to the resultant solution with stirring. After stirred for 30 min, a small amount of methanol was added to the solution to stop polymerizing.

The obtained mixture was poured into methanol containing hydrogen chloride (HCl) to give a styrene polymer product. The crude styrene polymer product was washed with methanol, filtered, and vacuum-dried to obtain a pure styrene polymer. The physical properties of the polystyrene obtained by polymerization are shown in Table 6.

TABLE 6

| Half metallocene catalyst (mol) | Compound having at least two functional groups (mol) | Mole of N(C$_2$H$_5$)$_3$ | Yield (g) | Activity Kg · PS/[Ti] [St]hr | Stereo-regularity (%) |
|---|---|---|---|---|---|
| Cp*Ti(OMe)$_2$Cl ($4 \times 10^{-6}$ mol) | 1,10-Decandiol ($2 \times 10^{-6}$ mol) | $4 \times 10^{-6}$ mol | 1.65 | 18922 | 97 |
| Cp*Ti(OMe)Cl$_2$ ($4 \times 10^{-6}$ mol) | 1,10-Decandiol ($4 \times 10^{-6}$ mol) | $8 \times 10^{-6}$ mol | 1.71 | 19610 | 97 |
| Cp*TiCl$_3$ ($4 \times 10^{-6}$ mol) | 1,10-Decandiol ($6 \times 10^{-6}$ mol) | $12 \times 10^{-6}$ mol | 2.01 | 23050 | 98 |
| Cp*TiCl$_3$ | 4,4'- | $12 \times 10^{-6}$ | 2.34 | 26835 | 98 |

TABLE 6-continued

| Half metallocene catalyst (mol) | Compound having at least two functional groups (mol) | Mole of $N(C_2H_5)_3$ | Yield (g) | Activity Kg · PS/[Ti] [St]hr | Stereo-regularity (%) |
|---|---|---|---|---|---|
| $(4 \times 10^{-6}$ mol) | Isopropylidene-diphenol $(6 \times 10^{-6}$ mol) | mol | | | |

Example 25

Modified Method for Solution Polymerization of Styrene (III)

A temperature-controlling equipment and a magnetic stirrer or a mechanical stirrer were used for the styrene polymerization. The polymerization was performed in a glass reactor with a valve capable of applying monomer and nitrogen gas. After purified toluene (40 cc) was added to a reaction container 1 filled with nitrogen gas instead of air, purified styrene was added. To another reaction container 2, pentamethylcyclopentadienyltitanium trichloride [Cp*TiCl$_3$] and pentamethylcyclopentadienyldimethoxytitanium monochloride [Cp*Ti(OMe)$_2$Cl] of $4 \times 10^{-6}$ mol diluted with toluene (20 cc) were added. To the mixed solution in reaction container 2, the solution composed of triethylamine and the compound having at least two functional groups which is represented in the following Table 7 in toluene of 20 cc was added with stirring. After the mixed solution was stirred for 5 hours at room temperature, the reaction temperature was raised up to 70° C. Methylaluminoxane (concentration of aluminium=$1.0 \times 10^{-3}$ mol) as a co-catalyst was added to the resultant solution with stirring and aged for 10 min. The aged mixed solution in reaction container 2 was added to the reaction container 1. The obtained mixture was poured into methanol containing hydrogen chloride (HCl) to give a styrene polymer product. The crude styrene polymer product was washed with methanol, filtered, and vacuum-dried to obtain a pure styrene polymer. The physical properties of the polystyrene obtained by polymerization are shown in Table 7.

TABLE 7

| Half metallocene catalyst (mol) | Compound having at least two functional groups (mol) | Mole of $N(C_2H_5)_3$ | Yield (g) | Activity Kg · PS/[Ti] [St]hr | Stereo-regularity (%) |
|---|---|---|---|---|---|
| Cp*Ti(OMe)$_2$Cl $(4 \times 10^{-6}$ mol) | 1,10-Decandiol $(2 \times 10^{-6}$ mol) | $4 \times 10^{-6}$ mol | 1.76 | 20183 | 98 |
| Cp*TiCl$_3$ $(4 \times 10^{-6}$ mol) | 4,4'-4,4'-Isopropylidene-diphenol $(6 \times 10^{-6}$ mol) | $12 \times 10^{-6}$ mol | 2.36 | 27064 | 98 |

Example 26

Stability Test of the Catalyst for the Air and Moisture

The catalysts 2, 16 and 18 prepared in the same manner as in Examples 2, 16 and 18 were exposed to air for one day. The styrene polymerization was performed in the same manner as in Example 19 with the air-exposed catalysts. The styrene polymerization was performed in the same manner as in Example 19 with the catalyst which was not exposed to the air and moisture. The physical properties of the polystyrenes are shown in Table 8.

TABLE 8

| Catalyst | Yield(g) | Activity Kg · PS/[Ti][St]hr | Stereo-regularity (%) |
|---|---|---|---|
| Catalyst 2: no exposure to the air | 0.89 | 21654 | 97 |
| Catalyst 2: exposure to the air | 1.98 | 11228 | 95 |
| Catalyst 16: no exposure to the air | 2.31 | 26467 | 98 |
| Catalyst 16: exposure to the air | 1.61 | 18446 | 96 |
| Catalyst 18: no exposure to the air | 2.81 | 32195 | 98 |
| Catalyst 18: exposure to the air | 1.93 | 22113 | 96 |

Example 27

Copolymerization of Styrene With p-Methylstyrene

The polymerization reaction was proceeded with concentration of the catalyst 2, 16 or 18 (concentration of titanium of $4 \times 10^{-6}$ mol), styrene monomer of 5.44 cc, p-methylstyrene of 0.325 cc, toluene of 80 cc and concentration of aluminium contained in modified methylaluminoxane$1 \times 10^{-3}$ mol, for 30 min and at 70° C.

A temperature-controlling equipment and a magnetic stirrer or a mechanical stirrer were used for the styrene polymerization. The polymerization was performed in a glass reactor with a valve capable of applying monomer and nitrogen gas. After purified toluene (80 cc) was added to a glass flask filled with nitrogen gas instead of air, purified styrene (5.44 cc) and p-methylstyrene (0.325 cc) was added, and then modified methylaluminoxane (concentration of aluminium=$1 \times 10^{-3}$ mol) as a co-catalyst was added with stirring. To the above mixed solution, a certain amount of a catalyst (concentration of titanium=$4 \times 10^{-6}$ mol) was added to start polymerizing of the monomer. After the solution was stirred for a while, a small amount of methanol was added to stop proceeding polymerization. The obtained mixture was poured into methanol containing hydrogen chloride (HCl) to give a styrene polymer product. The crude styrene polymer product was washed with methanol, filtered, and vacuum-dried to obtain a pure styrene polymer. The physical properties of the copolymerized styrene obtained by polymerization are shown in Table 9.

TABLE 9

| Catalyst (Example) | Yield (g) | Activity Kg · PS/[Ti][St]hr | Stereo-regularity (%) | Content of monomer (%) | Tg (° C.) | Tm (° C.) |
|---|---|---|---|---|---|---|
| Catalyst 2 | 2.32 | 23200 | 99 | 7.1 | 100 | 245 |
| Catalyst 16 | 2.81 | 28100 | 99 | 7.5 | 101 | 245 |
| Catalyst 18 | 3.24 | 32400 | 99 | 8.1 | 99 | 243 |

Example 28

Copolymerization of Styrene With Divinylbenzene

The polymerization reaction was proceeded with concentration of the catalyst 2, 16 or 18 (concentration of titanium of $4\times10^{-6}$ mol), styrene monomer of 5 cc, divinylbenzene of 0.082 cc, toluene of 80 cc, and the modified methylaluminoxane having concentration of aluminium of $1\times10^{-3}$ mol, for 30 min and at 70° C.

A temperature-controlling equipment and a magnetic stirrer or a mechanical stirrer were used for the styrene polymerization. The polymerization was performed in a glass reactor with a valve capable of applying monomer and nitrogen gas. After purified toluene (80 cc) was added to a glass flask filled with nitrogen gas instead of air, purified styrene (5 cc) and divinylbenzene (0.082 cc) was added, and then modified methylaluminoxane (concentration of aluminium=$1\times10^{-3}$ mol) as a co-catalyst was added with stirring. To the above mixed solution, a certain amount of a catalyst (concentration of titanium=$4\times10^{-6}$ mol) was added to start polymerizing of the monomer. After the solution was stirred for a while, a small amount of methanol was added to stop proceeding polymerization. The obtained mixture was poured into methanol containing hydrogen chloride (HCl) to give a styrene polymer product The crude styrene polymer product was washed with methanol, filtered, and vacuum-dried to obtain a pure styrene polymer. The physical properties of the copolymerized styrene obtained by polymerization are shown in Table 10.

TABLE 10

| Catalyst (Example) | Yield (g) | Activity Kg · PS/ [Ti][St]hr | Stereo-regularity (%) | Content of monomer (%) | Tg (° C.) | Tm (° C.) |
|---|---|---|---|---|---|---|
| Catalyst 2 | 1.64 | 18788 | 99 | 0.9 | 100 | 254 |
| Catalyst 16 | 1.76 | 20163 | 99 | 0.9 | 99 | 255 |
| Catalyst 18 | 2.02 | 23142 | 99 | 0.9 | 99 | 253 |

Example 29

Copolymerization of Styrene With 1,3-Butadiene

The polymerization reaction was proceeded with concentration of the catalyst 2, 16 or 18 (concentration of titanium of $4\times10^{-6}$ mol), styrene monomer of 0.3 mol, 1,3-butadiene of 0.30 mol, and the modified methylaluminoxane having concentration of aluminium of $1\times10^{-2}$ mol, for 4 hrs and at 30° C.

A temperature-controlling equipment and a magnetic stirrer or a mechanical stirrer were used for the styrene polymerization. The polymerization was performed in a glass reactor with a valve capable of applying monomer and nitrogen gas. The purified styrene (0.3 mol) and 1,3-butadiene (0.3 mol) was added to a glass flask filled with nitrogen gas instead of air, and then modified methylaluminoxane (concentration of aluminium=$1\times10^{-2}$ mol) as a co-catalyst was added with stirring. To the above mixed solution, a certain amount of a catalyst (concentration of titanium=$4\times10^{-6}$ mol) was added to start polymerizing of the monomer. After the solution was stirred for 4 hours, a small amount of methanol was added to stop proceeding polymerization. The obtained mixture was poured into methanol containing hydrogen chloride (HCl) to give a styrene polymer product. The crude styrene polymer product was washed with methanol, filtered, and vacuum-dried to obtain a pure styrene polymer. The physical properties of the copolymerized styrene obtained by polymerization are shown in Table 11.

TABLE 11

| Catalyst (Example) | Yield (g) | Activity Kg · PS/ [Ti][St]hr | Stereo-regularity (%) | Content of monomer (%) | Tg (° C.) | Tm (° C.) |
|---|---|---|---|---|---|---|
| Catalyst 2 | 10.89 | 113.4 | 96 | 8.4 | 84 | 267 |
| Catalyst 16 | 12.73 | 132.6 | 95 | 8.1 | 86 | 268 |
| Catalyst 18 | 13.64 | 142.1 | 96 | 8.6 | 84 | 269 |

The stereoregularity in Table 1~11 was obtained in percent (%) by measuring the weight of the polymer which was extracted with methyl ethyl ketone, corresponding to syndiotactic index (S.I.). Also, the syndiotacticity of styrene polymer was measured with racemic pentad by using $^{13}$C-NMR. The glass transition temperature (Tg) and the melting point (Tm) in Table 1~11 were measured with Differential Scanning Calorimetry (DSC), by heating up to 300° C., resting for 5 min, cooling, and heating the test sample. The rate of temperature elevation was 10° C./min.

What is claimed is:

1. A method of polymerization comprising contacting monomers selected from the group consisting of styrene, derivatives of styrene, ethylenically unsaturated compounds with a catalyst system wherein said catalyst system comprises a co-catalyst and a catalyst of formula:

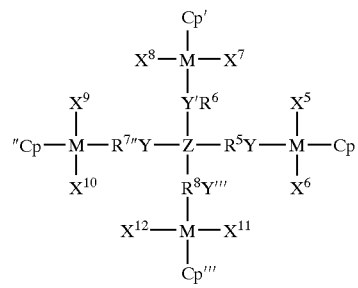

Formula V said catalyst prepared by reacting a metallocene compound represented by the general formulae:

(A)

or

(B)

with a compound having at least two functional groups represented by the general formulae (C), (D), or (E):

(C)

(D)

(E)

wherein M in the formulae (V), (A) and (B) represents a transition metal of group IV, V or VI of the periodic Table of the Elements;

$R^1$, $R^2$, $R^3$, and $R^4$ are selected from the group consisting of a hydrogen atom, a halogen atom, an alkyl group, a cycloalkyl group, an alkoxy group of $C_{1-20}$, an aryl group, an alkylaryl group, an arylalkyl group of $C_{6-20}$, a substituted or unsubstituted cyclopentadienyl group or derivatives thereof, a substituted or unsubstituted indenyl group or derivatives thereof, and a substituted or unsubstituted fluorenyl group or derivatives thereof, wherein at least one of $R^1$, $R^2$, $R^3$, and $R^4$ is a substituted or unsubstituted cyclopentadienyl group or derivatives thereof, a substituted or unsubstituted indenyl group or derivatives thereof, and a substituted or unsubstituted fluorenyl group or derivatives thereof;

a, b, and c are integers from 0 to 4; and d and e are integers from 0 to 3;

wherein $T^1$, $T^2$, $T^3$, and $T^4$ in the formulae (C), (D), and (E) are selected from the group consisting of a hydrogen atom, an alkyl group, a cycloalkyl group, an alkoxy group of $C_{1-20}$, an aryl group, an alkylaryl group, an arylalkyl group of $C_{6-20}$, and an alkali metal;

$X^5$, $X^6$, $X^7$, $X^8$, $X^9$, $X^{10}$, $X^{11}$, and $X^{12}$ are selected from the group consisting of a hydrogen atom, an alkyl group, a cyclyoalkyl group, an alkoxy group of $C_{1-20}$, an aryl group, an alkylaryl group, and an arylalkyl group of $C_{6-40}$;

Y, Y', Y'', and Y''' are selected from the group consisting of O, S, —$Nr^{17}$, and —$Pr^{18}$, wherein $r^{17}$ and $r^{18}$ are selected from the group consisting of a hydrogen atom, an alkyl group, a cycloalkyl group, an alkoxy group, an aryl group, an alkylaryl group, and an arylalkyl group of $C_{6-20}$;

$R^5$, $R^6$, $R^7$, and $R^8$ are selected from the group consisting of R', R'-m-R'', and

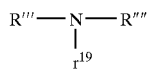

wherein R', R'', R''', and R'''' are selected from the group consisting of a linear alkylene group, a branched alkylene group of $C_{6-20}$, a cycloalkylene group, a substituted cyloalkylene group of $C_{3-20}$, an arylene group, an alkylarylene group, and an arylalkylene group of $C_{6-40}$; and $r^{19}$ is a hydrogen atom, an alkyl group, a cycloalkyl group, an alkoxy group of $C_{1-10}$, an aryl group, an alkylaryl group, or an arylalkyl group of $C_{6-20}$; and m is selected from the group consisting of an oxygen atom, a sulfur atom, —$Nr^{17}$, —$Pr^{18}$, and $Sir^{17}r^{18}$, wherein $r^{17}$ and $r^{18}$ are selected from the group consisting of a hydrogen atom, an alkyl group, a cycloalkyl group, an alkoxy group of $C_{1-10}$, an aryl group, an alkyl group, and an arylalkyl group Of $C_{6-20}$; and Q is N or —$Cr^{20}$ wherein $r^{20}$ is selected from the group consisting of an alkyl group, a cycloalkyl group, an alkoxy group of $C_{1-10}$, an aryl group, an alkylaryl group, and an arylalkyl group of $C_{6-20}$; and

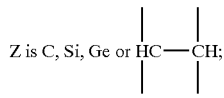

Cp, Cp', Cp'', and Cp''' are selected from the group consisting of a cyclopentadienyl group, an indenyl group, a fluorenyl group or a derivative of each group which forms $\eta^5$-bond with a transition metal, and compounds having formulas (a), (b), (c), and (d) as follows:

(a)
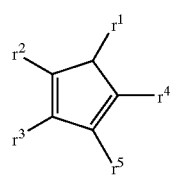

(b)
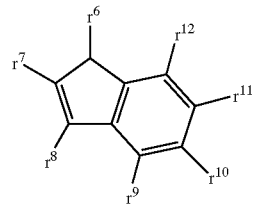

(c)
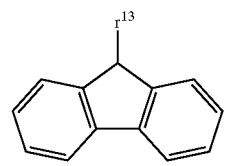

(d)
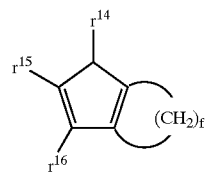

wherein $r^1$, $r^2$, $r^3$, $r^4$, $r^5$, $r^6$, $r^7$, $r^8$, $r^9$, $r^{10}$, $r^{11}$, $r^{12}$, $r^{13}$, $r^{14}$, $r^{15}$ and $r^{16}$ are selected from the group consisting of a hydrogen atom, an alkyl group, a cycloyalkyl group, an alkoxy group of $C_{1-20}$, an aryl group, an alkylaryl group, and an arylalkyl group of $C_{1-20}$; and f is an integer of 4 to 8;

wherein said step of contacting said monomers with said catalyst system comprises:
  reacting said metallocene compound and said compound having at least two functional groups in a polymerization reactor filled with said monomers, and
  adding said co-catalyst to said polymerization reactor.

2. The method of claim 1 wherein said step of contacting said monomers with said catalyst system further comprises:
  reacting said metallocene compound and said compound having at least two functional groups in a reactor filled with said co-catalyst to form a resulting solution,
  aging the resulting solution at a temperature of 0–150° C. for from about 1 to about 60 minutes to form an aged solution, and
  adding the aged solution to a polymerization reactor filled with said monomers.

3. A method of polymerization comprising contacting monomers selected from the group consisting of styrene, derivatives of styrene, ethylenically unsaturated compounds with a catalyst system wherein said catalyst system comprises a co-catalyst and a catalyst of formula:

Formula V

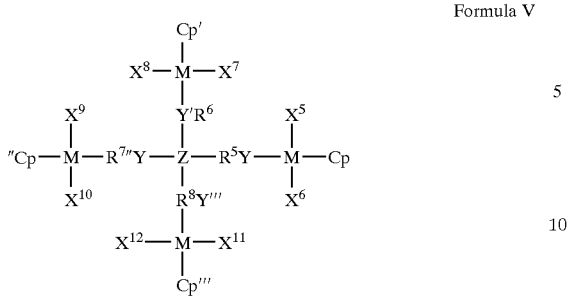

said catalyst prepared by reacting a metallocene compound represented by the general formulae:

$$MR^1{}_aR^2{}_bR^3{}_cR^4{}_{4-(a+b+c)} \quad (A)$$

or $$MR^1{}_dR^2{}_eR^3{}_{3-(d+e)} \quad (B)$$

with a compound having at least two functional groups represented by the general formulae (C), (D), or (E):

 (C)

 (D)

 (E)

wherein M in the formulae (A) and (B) represents a transition metal of group IV, V or VI of the periodic Table of the Elements;

$R^1$, $R^2$, $R^3$, and $R^4$ are selected from the group consisting of a hydrogen atom, a halogen atom, an alkyl group, a cycloalkyl group, an alkoxy group of $C_{1-20}$, an aryl group, an alkylaryl group, an arylalkyl group of $C_{6-20}$, a substituted or unsubstituted cyclopentadienyl group or derivatives thereof, a substituted or unsubstituted indenyl group or derivatives thereof, and a substituted or unsubstituted fluorenyl group or derivatives thereof, wherein at least one of $R^1$, $R^2$, $R^3$, and $R^4$ is a substituted or unsubstituted cyclopentadienyl group or derivatives thereof, a substituted or unsubstituted indenyl group or derivatives thereof, and a substituted or unsubstituted fluorenyl group or derivatives thereof;

a, b, and c are integers from 0 to 4; and d and e are integers from 0 to 3;

wherein $T^1$, $T^2$, $T^3$, and $T^4$ in the formulae (C), (D), and (E) are selected from the group consisting of a hydrogen atom, an alkyl group, a cycloalkyl group, an alkoxy group of $C_{1-20}$, an aryl group, an alkylaryl group, an arylalkyl group of $C_{6-20}$, and an alkali metal;

$X^5$, $X^6$, $X^7$, $X^8$, $X^9$, $X^{10}$, $X^{11}$, and $X^{12}$ are selected from the group consisting of a hydrogen atom, an alkyl group, a cycloalkyl group, an alkoxy group of $C_{1-20}$, an aryl group, an alkylaryl group, and an arylalkyl group of $C_{6-40}$;

Y, Y', Y", and Y'" are selected from the group consisting of O, S, —Nr$^{17}$, and —Pr$^{18}$, wherein r$^{17}$ and r$^{18}$ are selected from the group consisting of a hydrogen atom, an alkyl group, a cycloalkyl group, an alkoxy group, an aryl group, an alkylaryl group, and an arylalkyl group of $C_{6-20}$;

$R^5$, $R^6$, $R^7$, and $R^8$ are selected from the group consisting of R', R'-m-R", and

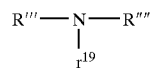

wherein R', R", R'", and R"" are selected from the group consisting of a linear alkylene group, a branched alkylene group of $C_{6-20}$, a cycloalkylene group, a substituted cycloalkylene group of $C_{3-20}$, an arylene group, an alkylarylene group, and an arylalkylene group of $C_{6-40}$; and r$^{19}$ is a hydrogen atom, an alkyl group, a cycloalkyl group, an alkoxy group of $C_{1-10}$, an aryl group, an alkylaryl group, or an arylalkyl group of $C_{6-20}$; and m is selected from the group consisting of an oxygen atom, a sulfur atom, —Nr$^{17}$, —Pr$^{18}$, and Sir$^{17}$r$^{18}$, wherein r$^{17}$ and r$^{18}$ are selected from the group consisting of a hydrogen atom, an alkyl group, a cycloalkyl group, an alkoxy group of $C_{1-10}$, an aryl group, an alkyl group, and an arylalkyl group of $C_{6-20}$; and Q is N or —Cr$^{20}$ wherein r$^{20}$ is selected from the group consisting of an alkyl group, a cycloalkyl group, an alkoxy group of $C_{1-10}$, an aryl group, an alkylaryl group, and an arylalkyl group of $C_{6-20}$; and

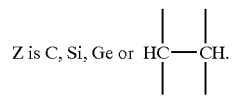

Cp, Cp', Cp", and Cp'" are selected from the group consisting of a cyclopentadienyl group, an indenyl group, a fluorenyl group or a derivative of each group which forms η$^5$-bond with a transition metal, and compounds having formulas (a), (b), (c), and (d) as follows:

 (a)

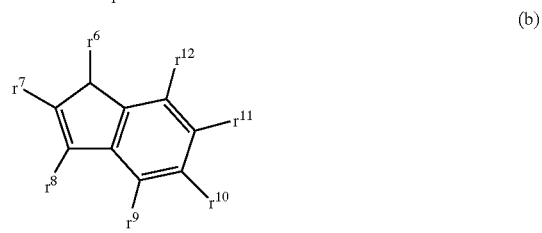 (b)

-continued (c) 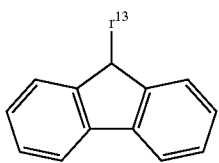

(d) 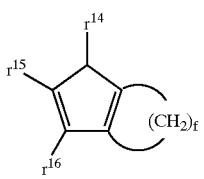

wherein $r^1, r^2, r^3, r^4, r^5, r^6, r^7, r^8, r^9, r^{10}, r^{11}, r^{12}, r^{13}, r^{14}, r^{15}$, and $r^{16}$ are selected from the group consisting of a hydrogen atom, an alkyl group, a cyclyalkyl group, a cyclyalkyl group, an alkoxy group of $C_{1-20}$, an aryl group, an alkylaryl group, and an arylalkyl group of $C_{1-20}$; and f is an integer of 4 to 8.

4. The method of claim 3 wherein said step of contacting said monomers with said catalyst system comprises:
reacting said metallocene compound and said compound having at least two functional groups in a reactor filled with said co-catalyst to form a resulting solution,
aging the resulting solution at a temperature of 0–150° C. for from about 1 to about 60 minutes to form an aged solution, and
adding the aged solution to a polymerization reactor filled with said monomers.

* * * * *